US010511521B2

United States Patent
Lapidous et al.

(10) Patent No.: US 10,511,521 B2
(45) Date of Patent: Dec. 17, 2019

(54) SYSTEM AND METHOD FOR VIRTUAL MULTIPATH DATA TRANSPORT

(71) Applicant: AnchorFree Inc, Menlo Park, CA (US)

(72) Inventors: Eugene Lapidous, Saratoga, CA (US); Dmitry Adamushka, Antwerp (BE)

(73) Assignee: ANCHORFREE INC., Redwood City, CA (US)

( * ) Notice: Subject to any disclaimer, the term of this patent is extended or adjusted under 35 U.S.C. 154(b) by 136 days.

(21) Appl. No.: 15/402,049

(22) Filed: Jan. 9, 2017

(65) Prior Publication Data

US 2018/0041613 A1   Feb. 8, 2018

Related U.S. Application Data

(60) Provisional application No. 62/370,496, filed on Aug. 3, 2016.

(51) Int. Cl.
*H04L 12/707* (2013.01)
*H04L 29/06* (2006.01)
(Continued)

(52) U.S. Cl.
CPC ............ *H04L 45/24* (2013.01); *H04L 1/1867* (2013.01); *H04L 1/1874* (2013.01);
(Continued)

(58) Field of Classification Search
CPC ..... H04L 45/24; H04L 12/4633; H04L 69/14; H04L 12/4641; H04L 1/1887;
(Continued)

(56) References Cited

U.S. PATENT DOCUMENTS 4,914,654 A * 4/1990 Matsuda ............... H04L 1/0083
370/522
6,505,253 B1   1/2003 Chiu
(Continued)

FOREIGN PATENT DOCUMENTS

WO   WO2000011849   2/2000

*Primary Examiner* — Ajit Patel
*Assistant Examiner* — Wilfred Thomas
(74) *Attorney, Agent, or Firm* — David R. Stevens; Stevens Law Group

(57) ABSTRACT

A computer system splits data to be transmitted into a plurality of reliable connections which are multiplexed through a smaller number of unacknowledged connections, such as connections that do not require acknowledgment and which may be VPN tunnels. A receiver then demultiplexes data received to obtain data flows over the reliable connections and transmits separate acknowledgements for each reliable connection. The computer system demultiplexes the acknowledgments and provides them to the corresponding reliable connections, which then retransmit any unacknowledged data. Delivery controllers executing on the computer system may be coupled to corresponding controllers executing on the receiver, with traffic between the delivery controllers (payload and acknowledgments) being multiplexed over one or more unacknowledged connections. In some embodiments, acknowledgments may be transmitted over a connection that is not multiplexed over the unacknowledged connections.

15 Claims, 7 Drawing Sheets

(51) Int. Cl.
  *H04L 29/08* (2006.01)
  *H04L 29/14* (2006.01)
  *H04L 12/46* (2006.01)
  *H04L 1/18* (2006.01)
  *H04L 12/803* (2013.01)
  *H04L 12/801* (2013.01)
  *H04L 1/00* (2006.01)

(52) U.S. Cl.
  CPC ........ *H04L 1/1887* (2013.01); *H04L 12/4633* (2013.01); *H04L 12/4641* (2013.01); *H04L 47/10* (2013.01); *H04L 47/125* (2013.01); *H04L 65/1069* (2013.01); *H04L 67/2819* (2013.01); *H04L 67/2833* (2013.01); *H04L 67/2876* (2013.01); *H04L 67/42* (2013.01); *H04L 69/08* (2013.01); *H04L 69/14* (2013.01); *H04L 69/163* (2013.01); *H04L 69/40* (2013.01); *H04L 47/14* (2013.01); *H04L 2001/0097* (2013.01); *H04L 2212/00* (2013.01); *Y02D 50/30* (2018.01)

(58) Field of Classification Search
  CPC ..... H04L 1/1874; H04L 47/125; H04L 69/08; H04L 1/1867; H04L 67/2876; H04L 65/1069; H04L 47/10; H04L 69/163; H04L 2212/00; H04L 2001/0097
  See application file for complete search history.

(56) References Cited

U.S. PATENT DOCUMENTS

| | | |
|---|---|---|
| 6,711,166 B1 | 3/2004 | Amir |
| 7,539,179 B1 | 5/2009 | Baird |
| 7,782,759 B2 | 8/2010 | Sridharan |
| 7,839,890 B1* | 11/2010 | Neitzel .................. H04L 29/06 370/229 |
| 8,291,116 B2 | 10/2012 | Read |
| 8,391,302 B1 | 3/2013 | Kommidi |
| 8,467,342 B2 | 6/2013 | Loh |
| 8,483,133 B2 | 7/2013 | Navratil |
| 9,185,011 B1 | 11/2015 | Roskind |
| 2002/0071436 A1 | 6/2002 | Border |
| 2002/0073226 A1* | 6/2002 | Sridhar .................. H04L 29/06 709/235 |
| 2004/0151206 A1* | 8/2004 | Scholte ............ H04L 29/06027 370/473 |
| 2005/0237997 A1* | 10/2005 | Hoffmann ......... H04L 29/06027 370/352 |
| 2006/0053223 A1 | 3/2006 | Tucker et al. |
| 2006/0059256 A1 | 3/2006 | Kakani |
| 2007/0127424 A1* | 6/2007 | Kwon .................. H04L 1/1614 370/338 |
| 2008/0037540 A1 | 2/2008 | Ngo |
| 2008/0130496 A1* | 6/2008 | Kuo ........................ H04B 7/04 370/230.1 |
| 2008/0232390 A1* | 9/2008 | Nakata .................... H04L 45/00 370/439 |
| 2011/0141904 A1* | 6/2011 | Viger .................... H04L 47/196 370/241 |
| 2012/0093150 A1* | 4/2012 | Kini ....................... H04L 45/24 370/389 |
| 2012/0287806 A1* | 11/2012 | Williams ............... H04L 1/0041 370/252 |
| 2013/0195004 A1* | 8/2013 | Hampel .................. H04L 69/16 370/315 |
| 2013/0346700 A1 | 12/2013 | Tomlinson |
| 2014/0055464 A1 | 2/2014 | Srinivas et al. |
| 2014/0351447 A1* | 11/2014 | Annamalaisami .......................... H04L 65/1069 709/227 |
| 2016/0099963 A1 | 4/2016 | Mahaffey et al. |
| 2017/0187587 A1* | 6/2017 | Keppel ................. H04L 43/062 |

* cited by examiner

SYSTEM AND METHOD FOR VIRTUAL MULTIPATH DATA TRANSPORT

RELATED APPLICATIONS

This application claims the benefit of U.S. Provisional Application Ser. No. 62/370,496, filed Aug. 3, 2016. This application is also related to U.S. application Ser. No. 15/402,024 filed Jan. 9, 2017. The applications are incorporated herein by reference for all purposes.

FIELD OF THE INVENTION

The present invention relates generally to systems and methods for transporting data from multiple computers over a network connection.

BACKGROUND OF THE INVENTION

The amount of online content downloaded over computer networks is rapidly increasing with time due to multiple factors such as popularity of online video streaming and user-generated content, proliferation of social networks and media-rich messaging, cloud-based storage, etc.

Requested content often must be delivered over long distances. Only the most popular videos can be cached near the user. Content that uses secure protocols like HTTPS can't be cached without allowing access to unencrypted content to the third parties. Remote viewing of events streamed in real time, such as sports and news can't use caching. Local content is often not cached outside of the countries of origin.

Increase of the data travel distance is often accompanied by an increased rate of packet losses. If a connection uses a reliable-delivery protocol such as Transport Control Protocol (TCP), these losses are usually interpreted as last-mile congestion, resulting in significant decrease in the throughput, even if each segment of the connection pipe is far from the saturation point.

The systems and methods disclosed herein provide an improved approach to transferring data over reliable-delivery transport connections.

BRIEF SUMMARY OF THE INVENTION

In one aspect of the invention, a method includes
(a) providing, by a computer system, a first number of one or more first network connections to a remote computing device;
(b) providing, by the computer system, a second number of second network connections to the remote computing device, the first number being smaller than the second number;
(c) multiplexing, by the computer system, a plurality of second data flows of the second network connections in one or more first data flows through the one or more first network connections;
(d) receiving, by the computer system, an instruction to transmit payload data to the remote computing device; and
(e) in response to the instruction
 (i) dividing, by the computer system, the payload data into data portions;
 (ii) transmitting, by the computer system, the data portions over different connections of the second connections;
 (iii) multiplexing, by the computer system, the data portions transmitted over the second connections through the one or more first network connections;
 (iv) receiving, by the computer system, one or more acknowledgements for the data portions, each acknowledgment of the one or more acknowledgments referencing a second connection of the second connections;
 (v) demultiplexing, by the computer system, each acknowledgment of the one or more acknowledgments onto the second connection referenced by the each acknowledgment;
 (vi) determining, by the computer system, that acknowledgment was not received for at least one data portion of the data portions by at least one second connection of the second connections over which the at least one data portion was transmitted; and
 (vii) in response to determining that acknowledgment was not received for the at least one data portion, retransmitting the at least one data portion over the at least one second connection.

In some embodiments, multiplexing the plurality of second data flows of the second network connections in the one or more first data flows through the one or more first network connections comprises transmitting the one or more first data flows without regard to any acknowledgment of the one or more first data flows.

In some embodiments, multiplexing the plurality of second data flows of the second network connections in the one or more first data flows through the one or more first network connections comprises transmitting the one or more first data flows according to at least one of Universal Datagram Protocol (UDP), Internet Protocol (IP) Encapsulating Security Payload (ESP), and Software IP Encryption Protocol (swIPe).

In some embodiments, providing the second network connections comprises implementing the second network connections according to at least one of Transport Control Protocol (TCP), Multipath Transport Control Protocol (Multipath TCP) and Stream Control Transmission Protocol (SCTP).

In some embodiments, the computer system implements a plurality of delivery controllers, each controller of the plurality of delivery controllers coupled to a corresponding controller executing on the remote device and implementing one of the second connections. In such embodiments, (vi) and (vii) may be performed by at least one delivery controller of the delivery controllers, the at least one delivery controller implementing the at least one second connection. The method may further include in response to (vi), reducing, by the at least one delivery controller, an amount of unacknowledged data that may be transmitted before transmitting additional data over the at least one second connection.

In some embodiments, the computer system comprises a client computing device and a virtual private network (VPN) server device in data communication with the client computing device. The method may further include performing (a), (c), (iii), (iv), and (v) by the VPN server device and performing (b), (i), (ii), (vi), and (vii) by the client computing device.

In some embodiments (ii) comprises transmitting a plurality of packets containing the data portions over the second connections and (iii) comprises encapsulating the plurality of packets inside the one or more first data flows.

In some embodiments, the client computing device and VPN server device implement at least one of Point-to-Point Tunneling Protocol (PPTP), Layer 2 Tunneling Protocol (L2TP), Internet Protocol Security (IPSec), Secure Socket Layer (SSL) Protocol, Transport Layer Security (TLS) protocol, and OpenVPN protocol.

In some embodiments, the computer system implements a proxy, the proxy performing (b), (d), (i), (ii), (vi) and (vii).

In some embodiments, (c) comprises encrypting one or more first data flows after multiplexing the plurality of second data flow in the one or more first data flows through the one or more first network connections.

In some embodiments, the computer system comprises a plurality of different computing devices in a first local network, the remote computing device being located in second local network remote from the first local network. In other embodiments, the computer system comprise a single computing device.

In some embodiments, (iv) comprises receiving, by the computer system, the one or more acknowledgements for the data portions in a third data flow that is not encapsulated in the one or more first data flows of the one or more first network connections.

In some embodiments, the first number is one.

In another aspect of the invention a computer system includes one or more computing devices, the one or more computing devices each comprising one or more processing devices and one or more memory devices operably coupled to the one or more processing devices. The one or more memory devices of the one or more computing devices store executable code effective to cause the one or more processors of the one or more computing devices to:
  establish a first number of one or more first network connections terminating at a remote computing device;
  establish a second number of second network connections terminating at the remote computing device through the first network connections, the first number being smaller than the second number;
  transmit payload data to the remote computing device by
    (i) dividing the payload data into data portions;
    (ii) transmitting the data portions over different connections of the second connections; and
    (iii) multiplexing the data portions transmitted over the second connections through the one or more first network connections; and
  verify transmission of payload data to the remote computing device by
    (iv) receiving acknowledgments over the first network connections;
    (v) demultiplexing each acknowledgment onto a network connection of the second network connections referenced by the each acknowledgment; and
    (vi) if acknowledgment of receipt of one or more of the data portions is not received on one or more second connections of the one or more second connections, retransmitting the one or more data portions over the one or more second connections.

In some embodiments, the executable code is further effective to cause the one or more processors of the one or more computing devices to multiplex the data portions transmitted over the second connections through the one or more first network connections without regard to any acknowledgment of traffic traversing the one or more first network connections.

In some embodiments, the executable code is further effective to cause the one or more processors to implement the one or more first network connections according to at least one of Universal Datagram Protocol (UDP), Internet Protocol (IP) Encapsulating Security Payload (ESP), and Software IP Encryption Protocol (swIPe).

In some embodiments, the executable code is further effective to cause the one or more processors to implement the second network connections according to at least one of Transport Control Protocol (TCP), Multipath Transport Control Protocol (Multipath TCP) and Stream Control Transmission Protocol (SCTP).

In some embodiments, the computer system comprises a single computing device executing an operating system implementing a kernel space and a user space. The executable code may be further effective to cause the one or more processors to:
  implement the second network connections as kernel Transport Control Protocol (TCP) sockets implemented in the kernel space by a virtual network device, each kernel TCP socket of the kernel TCP sockets programmed to verify delivery of data transmitted over the each kernel TCP socket;
  receive the payload data from an application executing in the user space; and
  divide, by a multipath manager executing in the user space, the payload data into data portions and transmit each data portion to a different kernel TCP socket of the kernel TCP sockets as TCP packets.

In some embodiments, the executable code is further effective to cause the one or more processors to:
  implement a first TCP socket in kernel space coupled to the virtual network device;
  receive, by the virtual network device, the payload data from the application through the first TCP socket;
  intercept, by the virtual network device, the payload data from the first TCP socket;
  route, by the virtual network device, the payload data from the first TCP socket to the multipath manager.

In some embodiments, the executable code is further effective to cause the one or more processors to implement a transport proxy in the user space, the transport proxy programmed to terminate a connection from the first TCP socket and provide the payload data from the first TCP socket to the multipath manager.

In some embodiments, the executable code is further effective to cause the one or more processors to:
  intercept, by the virtual network device, the TCP packets transmitted through the kernel TCP sockets; and
  provide, by the virtual network device, the TCP packets to a virtual private network (VPN) client executing in the user space, the VPN client programmed to—
    encrypt and encapsulate the TCP packets to obtain outbound tunnel traffic; and
    transmit the outbound tunnel traffic over a first number of VPN tunnels to the remote computing device.

In some embodiments, the executable code is further effective to cause the one or more processors to:
  receive, by the VPN client, received tunnel traffic over the first number of VPN tunnels;
  decrypt and de-encapsulate, by the VPN client, the received tunnel traffic to obtain received TCP traffic; and
  demultiplex, by the VPN client, the received TCP traffic into the kernel TCP sockets.

In another aspect of the invention, a system includes one or more processing devices and one or more memory devices operably coupled to the one or more memory devices. The one or more memory devices store executable code effective to cause the one or more memory devices to:

execute a distributor, programmed to allocate data distributions from a data stream among a plurality of local delivery controllers;

execute the plurality of local delivery controllers, each local delivery controller coupled to a corresponding remote delivery controller of a plurality of remote delivery controllers executing on a remote computer system, each local delivery controller programmed to (a) regulate a flow of data between the corresponding remote delivery controller and the each local delivery controller, (b) to retransmit any unacknowledged data from outbound data of the flow of data, and (c) send the data distributions allocated to the each local delivery controller to the corresponding remote delivery controller in the flow of data;

execute a local multiplexer coupled by a transport connection to a remote multiplexer executing on the remote computer system, the local multiplexer programmed to (d) multiplex onto the transport connection the flows of data of the plurality of local delivery controllers and (e) demultiplex each acknowledgment received over the transport connection into the flow of data of one of the plurality of local delivery controllers referenced by the each acknowledgment;

wherein the executable data is further effective to cause the one or more processing devices to establish the transport connection to the remote computer system using one or more transport protocols that do not acknowledge data receipt.

In some embodiments, each local delivery controller of the plurality of local delivery controllers is further programmed to, independently from the other local delivery controllers and without exchanging information with the other local delivery controllers, change an amount of sent data that the each delivery controller permits to be sent through the data flow of the each local delivery controller before receiving an acknowledgement of at least some of the sent data from the corresponding remote delivery controller.

In some embodiments, each local delivery controller of the plurality of local delivery controllers is further programmed to execute one or more congestion control algorithms of the Transport Control Protocol (TCP) for the data flow.

In some embodiments, the one or more transport protocols that do not acknowledge data receipt include Universal Datagram Protocol (UDP).

In some embodiments, the executable code is further effective to cause the one or more processing devices to send the data distributions allocated to the each local delivery controller to the corresponding remote delivery controller using a secure communication protocol selected from the group including Secure Sockets Layer (SSL) protocol and Transport Layer Security (TLS) protocol.

In some embodiments, the distributor further comprises a proxy programmed to:
terminate the data stream;
extract payload data from the data stream
allocate the payload data among the plurality of local delivery controllers in the data allocations.

In some embodiments, the local multiplexer is programmed to multiplex onto the transport connection the flows of data of the plurality of local delivery controllers by (a) encrypting the flows of data after the flows of data are multiplexed with one another to obtain an encrypted data flow and (b) transmit the encrypted data flow to the remote multiplexer over the transport connection.

In another aspect of the invention, a method for network data transfer, includes:

(i) receiving, by a computer system over a computer network, first data from a first number of one or more first data flows, the one or more first data flows carrying multiplexed payload data of a second number of second data flows, the first number being smaller than the second number, the second data flows carrying different portions of original payload data of one or more third data flows;

(ii) demultiplexing, by the computer system the first data to obtain the second data flows;

(iii) after performing (ii), acknowledging, by the computer system, second data received in a first portion of the second data flows;

(iv) after performing (ii) receiving, by the computer system, over a second portion of the second data flows, retransmitted data and acknowledging the retransmitted data, the retransmitted data being multiplexed through the one or more first data flows; and (v) aggregating, by the computer system, the second data and the retransmitted data to obtain the original payload data of the one or more third data flows.

In some embodiments, the method further includes managing the one or more first data flows using one or more first transport protocols that do not acknowledge data receipt; and managing the second flows using one or more second transport protocols that acknowledge data receipt and retransmit unacknowledged data.

In some embodiments, the one or more first transport protocols include at least one of Universal Datagram Protocol (UDP), IP Encapsulating Security Payload (ESP) protocol, and Software IP Encryption protocol (swIPe).

In some embodiments, the one or more second transport protocols include at least one of Transport Control Protocol (TCP), Multipath Transport Control Protocol (Multipath TCP), and Stream Control Transmission Protocol (SCTP).

In some embodiments, the method further includes, for a second data flow of the second data flows, independently changing an amount of sent data that may be sent over the computer network within the second data flow before receiving an acknowledgement of at least some of the sent data without exchanging information with other second data flows of the second data flows.

In some embodiments, the one or more first data flows comprise first packets encapsulating second packets of the second flows data flow. In some embodiments, (iii) comprises sending at least some packets carrying acknowledgements of the second data without encapsulating the at least some packets inside the one or more first data flows.

In some embodiments, the one or more first data flows comprise a first transport connection; the second data flows comprise at least two second transport connections; and the second packets both of the at least two second transport connections are encapsulated within the first packets of the first transport connection.

In some embodiments, the first transport connection is a virtual private network (VPN) tunnel.

In some embodiments, the VPN tunnel implements a protocol selected from the group of Point-to-Point Tunneling Protocol (PPTP), Layer 2 Tunneling Protocol (L2TP), Internet Protocol Security (IPSec), Secure Socket Layer (SSL) protocol, and OpenVPN protocol.

In some embodiments, the method further includes:
(vi) receiving, by a first local delivery controller executing within the computer system, a first portion of a first second data flow including a first portion of the original payload data;
(vii) in response to (vi), transmitting, by the first local delivery controller, acknowledgment of the first portion of the first second data flow to a first remote delivery controller executing on a remote computing device coupled to the computer system by the computer network, the first remote delivery controller coupled to the first local delivery controller;
(iix) failing, by a second local delivery controller executing within the computer system, to receive a second portion of a second second data flow, the second portion including a second portion of the original payload data;
(ix) following (iix), receiving, by the second local delivery controller, retransmitted data corresponding to the second portion of the second second data flow over the second second data flow from a second remote delivery controller coupled to the second local delivery controller; and
(x) in response to (ix), transmitting, by the second local delivery controller, acknowledgment of the retransmitted data to the second remote delivery controller executing on the remote computing device.

In some embodiments, the multiplexed payload data of each first data flow of the one or more first data flows comprises payload data from two or more second data flows of the second data flows that has been aggregated into data units, each data unit containing data from a single second data flow of the two or more second data flows, the each first data flow carrying the data units from at least the two or more second data flows.

In some embodiments, the one or more first flows comprise transport connections according to a secure communication protocol from the group of Secure Sockets Layer (SSL) protocol and Transport Layer Security (TLS) protocol.

In some embodiments, the method further comprises:
receiving, by a remote computing device, the one or more third data flows over two or more coupled connections;
terminating, by the remote computing device, a first coupled connection of the two or more coupled connections prior to splitting the original payload between the second data into the different portions distributed among the second data flows; and
initiating, by the computer system, a second coupled connection of the two or more coupled connections before aggregating payload data from the second coupled connection from the second data flows.

In some embodiments, the two or more coupled connections comprise connections to and from proxies executing on the computer system and the remote computing device and programmed to terminate and initiate connections.

In some embodiments, the method further includes encrypting, by a remote computing device, the first data before transmitting the first data over computer network; and decrypting, by the computer system, the first data before demultiplexing the first data to obtain the second data flows.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
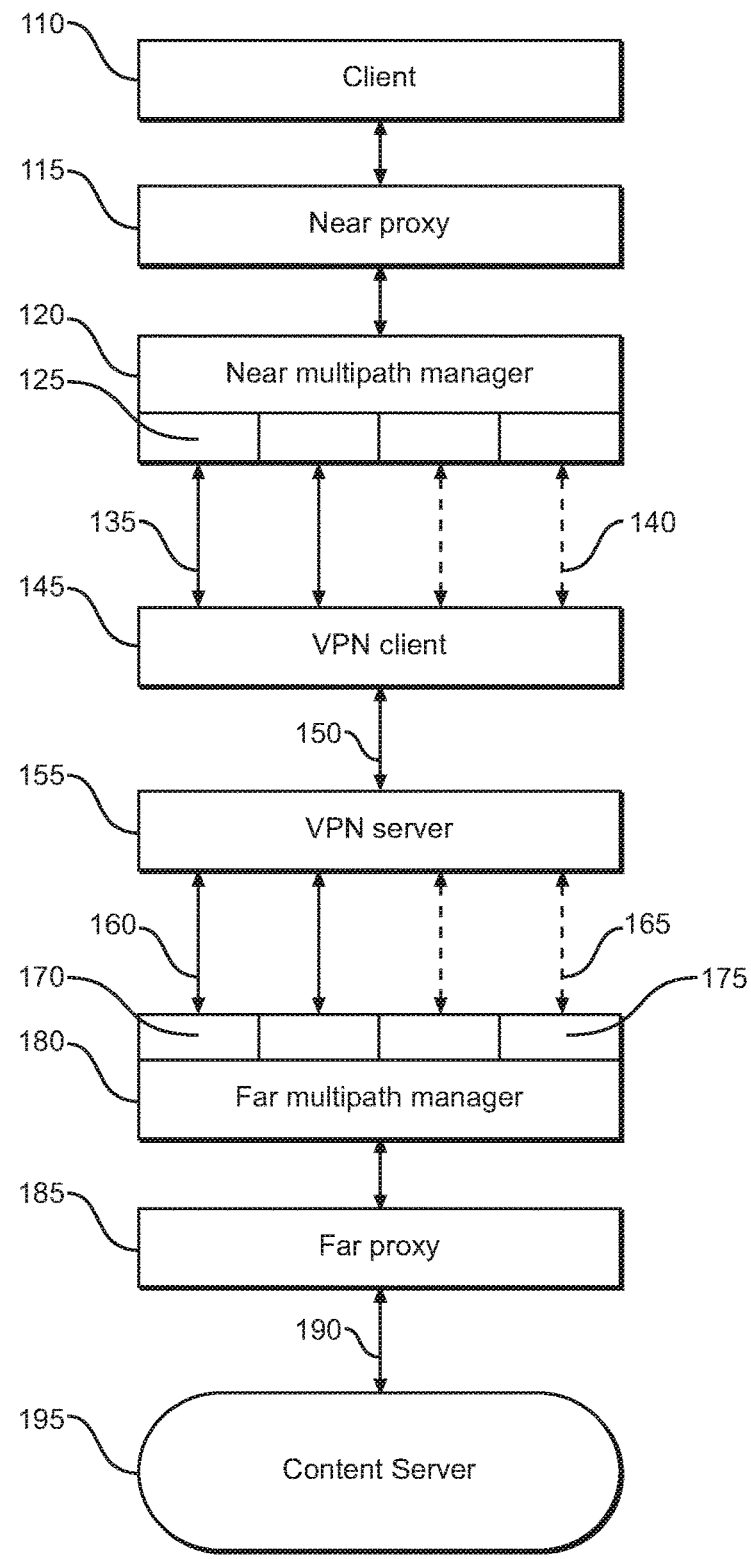
FIG. 1 is a diagram of a first network environment used to implement data transfer through multiple simultaneous transport connections multiplexed through a virtual private network (VPN) in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Spreading data transfer across multiple simultaneous reliable-delivery transport connections may be used to mitigate negative effect of random losses that are common in long-distance data connections. For instance, if a congestion window for one connection drops 50% after the packet loss, the aggregated congestion window for ten parallel connections only decreases by 5%.

However, if multiple transport connections are used to download the single file over the computer network, this may take more resources than downloading of the same file through a single connection: multipath transports take more per-connection queues on the routers and switches; they decrease effectiveness of per-connection throttling, etc. This is often considered to be unfair to other users of the same network path because it limits acceptance of other multipath transport connections.

One known method to mitigate this unfairness is to force multipath transports to consume an amount of resources similar to a single transport. For instance, congestion control algorithms for the Multipath TCP protocol extension are implemented with a goal to keep the total throughput through multiple connections on the same level as if the file was loaded though a single connection. This solution, while useful for smooth traffic handoff when switching between different networks, doesn't utilize performance advantages of the multipath transports over long distances.

Therefore, there is a need to improve fairness of splitting traffic between multiple TCP connections without negating performance advantages of the multipath transports over the long distances.

On the other side, multiple files are often transferred concurrently through a single connection, for instance when using a proxy or a virtual private network (VPN). Such transfers consume fewer resources per file than if each file would be transferred through its own connection, making it unfair to the proxy or VPN users. Therefore, there is also a need to improve ability of proxies and VPNs to get the fair share of limited resources.

In one aspect of the present invention, a first computing module and a second computing module are enabled to exchange data through a first number of transport connections; third computing module and fourth computing modules are enabled to exchange data through a second number of data flows, the first number being smaller than the second number, the second flows being multiplexed through the first transport connections by the first and the second modules; fifth computing module and sixth computing modules are enabled to exchange data through one or more third data flows, payload of the same third flow being split, by the third and the fourth modules, between two or more second flows before being transferred by one or more of the first connections, and then, after the second flows were demultiplexed from the one or more of the first connections, being aggregated from the second flows. In this aspect, the third and the fourth modules are further enabled to acknowledge the data received by one or more second flows after the second flows were demultiplexed from the one or more of the first connections, and to retransmit the data unacknowledged by at least one second flow through the same second flow, multiplexed through the one or more or the first connections.

In one embodiment, the first and the second modules exchange the data through the first connections by implementing one or more transport protocols enabled to receive the data without providing the acknowledgements of the received data, while the third and the fourth modules exchange the data through the second flows by implementing one or more transport protocols enabled to acknowledge received data and to retransmit unacknowledged data.

In one instance, the first and the second modules implement one or more protocols from the group of Universal Datagram Protocol (UDP), IP Encapsulating Security Payload (ESP) protocol and Software IP Encryption protocol (swIPe). In one example, the third and the fourth modules implement one or more protocols from the group of Transport Control Protocol (TCP), Multipath Transport Control Protocol (Multipath TCP) and Stream Control Transmission Protocol (SCTP).

In another embodiment, each of the third and the fourth modules comprises two or more coupled delivery controllers, coupled controller of the third module being associated with coupled controller of the fourth module, both controllers regulating the same second flow, each of these controllers being enabled to acknowledge the data received through the regulated flow, to retransmit unacknowledged data and to change amount of the data sent through that flow before receiving an acknowledgement of the previously sent data, without exchanging information with the controllers regulating other second flows.

In one implementation, the first and the second modules comprise a client and a server of a virtual private network (VPN), enabled to multiplex the packets of the second flows inside one or more of the first connections. In one instance, the third and the fourth modules implement second flows as transport connections exchanging plurality of data packets, while the first and the second modules encapsulate packets exchanged by the second flows inside the first connections. In one example, the VPN client and server implement a protocol from the group of Point-to-Point Tunneling Protocol (PPTP), Layer 2 Tunneling Protocol (L2TP), Internet Protocol Security (IPSec), Secure Socket Layer (SSL) protocol, Transport Layer Security (TLS) protocol and Open-VPN protocol.

In one other embodiment, the fifth and the sixth modules implement one or more of the third flows as transport connections with, correspondingly, the third and the fourth modules, the third and the fourth modules further comprising proxies receiving payload from these connections before it is split between the second flows, and sending payload through these connections after it is aggregated from the second flows.

In another embodiment, the first and the second modules are enabled to encrypt the multiplexed payload of the second flows before sending it through one or more of the first connections, and to decrypt the data received from one or more of the first flows before demultiplexing it into the second flows.

In one embodiment, the first, the third and the fifth modules reside on one or more computing devices within the first local network, while the second, the fourth and the sixth modules reside on one or more computing devices within the second local network, the first and the second local networks being connected over the wide area network. In one instance, the first, the third and the fifth modules reside on the first computing device, while the second, the fourth and the sixth modules reside on the second computing device, the first and the second device being connected over the computer network.

In one other embodiment, the third and the fourth modules are enabled to acknowledge the data received by one or more flows by sending at least some packets carrying the acknowledgements without encapsulating them inside the one or more of the first flows.

In another aspect of the present invention, the first and the second computers are exchanging the data over the computer network by using the following modules:
  two or more coupled delivery controllers, coupled controller of the first computer being associated with coupled controller of the second computer, both controllers regulating the same data flow between the first and the second computers, the controllers of that flow being enabled to send acknowledgements of received data and to retransmit the unacknowledged data for the regulated flow,
  one or more coupled multiplexors, coupled multiplexor of the first computer being associated with coupled multiplexor of the second computer, each set of coupled multiplexors being enabled to exchange data over one or more transport connections between the first and the second computers, one coupled multiplexor being enabled to multiplex two or more regulated flows over the one or more transport connections to another coupled multiplexor, enabled to demultiplex received data into the two or more regulated data flows,
  a distributor, enabled to distribute data of the data stream to the two or more delivery controllers on the same computer, the controllers sending the data over their regulated flows, and to aggregate the data of the data stream from the two or more delivery controllers, the controllers receiving the data from their regulated flows,
  where the first and the second computers establish one or more transport connections between the coupled multiplexors by using one or more transport protocols that support receiving the data without providing the acknowledgements to the sender.

In one embodiment, the coupled controllers regulating the same data flow are enabled to change the amount of data sent through that flow before receiving an acknowledgement of the previously sent data without exchanging information with the controllers regulating other second flows. In one implementation, coupled controllers use one or more congestion control algorithms of the Transport Control Protocol (TCP) for the regulated data flow.

In one instance, the transport protocol used by one or more transport connections is a Universal Datagram Protocol (UDP).

In another embodiment, the first and the second computers use secure communication protocol from the group of Secure Sockets Layer (SSL) and Transport Layer Security (TLS) protocols over the one or more established transport connections.

In one other embodiment, the distributor further comprises a proxy terminating the data stream and extracting its payload for distribution between the delivery controllers.

In one implementation, the first computer and the second computer are further enabled to encrypt the data over the one or more transport connections after it is multiplexed from the regulated flows and to decrypt the data received over the one or more transport connections before it is demultiplexed into the regulated flows.

In one other aspect of the present invention, one or more of the plurality of multipath connections are not multiplexed over one or more common transport connections; instead, these multipath connections are established directly between the computers exchanging the data over the WAN, in parallel with the connections used to multiplex multipath connections.

FIG. 1 is a diagram of a first network environment that may be used to implement data transfer through multiple simultaneous transport connections multiplexed through a virtual private network (VPN).

A client 110 establishes at least one connection to request content from a content server 195 over a computer network. A near proxy 115 terminates this connection and submits its payload to a near multipath manager 120. The near multipath manager 120 communicates with a plurality of delivery controllers 125. Each of these controllers is associated with a connection between the multipath manager 120 and a VPN client 145. Some of these connections are used to transfer the client data (135) and others may be kept in reserve (140).

In the depicted implementation, each delivery controller 125 comprises a TCP stack and the connections 135 and 145 are TCP connections encapsulated inside a tunnel 150 established between the VPN client 145 and a VPN server 155. The TCP connections are then passed to a far multipath manager 180 through connections 160 (with some connections 165 between far multipath manager 180 and VPN server 155 being kept in reserve in some embodiments) managed by delivery controllers 170. The far multipath manager may communicate with a far proxy 185, which connects to the content server 195.

In this implementation, TCP connections 135, 160 and connections 140, 165, respectively, the same connections, encapsulated within one or more VPN tunnels 150. In one example, a transport protocol used by VPN connection 150 does not support the acknowledgement of received packets or retransmission of any unacknowledged packets. In such embodiments, if there is a packet drop between the VPN client 145 and the VPN server 155, its payload is not retransmitted until it's demultiplexed into one of the delivery controllers 125 or 170. The transport protocol used by the VPN tunnel 150 could be, for instance, UDP (Universal Datagram Protocol), ESP (Encapsulating Security Payload) or swIPe(Software Internet Protocol (IP) Encryption Protocol) protocol. Any of these protocols may be used by the VPN client 145 and server 155 to implement secure, authenticated data exchange based on at least one of Point-to-Point Tunneling Protocol (PPTP), Layer 2 Tunneling Protocol (L2TP), Internet Protocol Security (IPSec), Secure Socket Layer (SSL) Protocol, Transport Layer Security (TLS) protocol, and OpenVPN protocol.

In this example, the VPN client 145 and server 155 multiplex TCP connections 135, 160 by encapsulating their packets, and de-multiplexing them by stripping the encapsulation headers. Each of the de-encapsulated packets is then passed to the corresponding TCP stack, which acknowledges the received packets and retransmits any previously sent packets that were not acknowledged by the receiver's TCP stack. For purposes of this disclosure unacknowledged data or packets that are not acknowledged may be understood to be data or packets for which an acknowledgment is not received within some timeout window.

In the depicted implementation, each of the delivery controllers in the groups 125 and 170 are independent from each other. In particular, each of the corresponding TCP stacks of the controllers 125, 170 keeps its own congestion window, specifying how many packets can be sent without receiving confirmation of the previously sent packets. As packets from different connections 135, 160 become lost during the data transfer inside the tunnel 150, each delivery controller 125, 170 retransmits its own unacknowledged packets and adjusts its own congestion window independently from the other delivery controllers 125, 170 based on the unacknowledged packets. If packet loss is random, this results in the same type of improvement as the data transfer across real multiple simultaneous reliable-delivery transport connections. For instance, if a congestion window for one TCP connection drops 50% after the packet loss, the aggregated congestion window for 10 parallel TCP connections only decreases by 5%.

At the same time, multiplexing of the multiple simultaneous transport connections 135, 160 over the same VPN tunnel 150 improves fairness of such virtual multipath transport in comparison with multipath transport over non-multiplexed connections. For instance, it a client opens a single VPN tunnel and then requests a single file from the content server, this file will be delivered through the computer network over the single transport connection, occupying only one per-connection-specific queue on each intermediate router or a switch.

While the virtual multipath transport through the single connection can consume more bandwidth than a single TCP connection over the same path, other modern network protocols also support higher bit rates than comparable TCP flows. For example, QUIC (Quick UDP Internet Connection) protocol, developed by Google Corporation and used by the popular Chrome browser, implements MulTCP (multiple TCP) congestion control algorithm, which is more aggressive than standard TCP. Therefore, the embodiments disclosed herein provide for virtual multipath transport that is more acceptable for a wide adoption by improving the balance between fairness and increased performance.

In some embodiments, at least one of the VPN client 145 and VPN server 155 is implemented as a stand-alone hardware module or an appliance, fully responsible for authentication and encryption of the traffic. In such embodiments, each proxy and multipath manager pair (proxy and multipath manager 115, 120; proxy and multipath manager 185, 180) is implemented as modules or processes on one or more computers on the same local network as a corresponding VPN module 145, 155. This embodiment has an advantage of re-using existing VPN infrastructure (for instance, IPSEC VPN appliances on the Enterprise network) without any changes to authentication and security protocols, such as network-level peer authentication, data origin authentication, data integrity and replay protection.

In some embodiments, proxy, multipath manager and VPN module may be deployed on the same computer. In some embodiments, a client application on a mobile device may integrate near proxy 115, near multipath manager 120 and VPN client 145. In another instance, VPN server 155 may be running on the same server computer as far multipath manager 180 and far proxy 185. In some embodiments, far multipath manager 180 and far proxy 185 could be deployed on a plug-in hardware module, integrated with the VPN server appliance 155.

In some embodiments, data encryption is only performed once for each data payload, thereby improving performance and saving computing resources. In some embodiments, multipath managers 120, 180 perform no authentication or encryption, relying instead on VPN modules 145, 155 to do it. In some embodiments, client 110 and content server 195, at least when exchanging the data over the HTTP protocol, would also rely on the VPN tunnel 150 to transfer data securely over a WAN (Wide Area Network). In other embodiments, VPN encryption may be disabled and the multipath managers 120, 180 would encrypt the traffic through transport connections 135, 140, 160, 165. In some embodiments, parts of the traffic would be encrypted either between the client 110 and the content server 195, while other part of the traffic would be encrypted between the multipath managers 120, 180. For instance, encryption of the data by the multipath transport managers 120, 180 would be disabled for the data exchanged by the client 110 and the content server 195 over the HTTPS protocol.

In some embodiments, verification of delivery of the data transferred over the computer network between the VPN client 145 and the VPN server 155 is accomplished only through simultaneous transport connections 135, 140, 160, 165 that use reliable-delivery transport protocol such as TCP. In this implementation, data received over the VPN tunnel 150 are not acknowledged until they are demultiplexed and reach delivery controllers 125, 170 of corresponding multipath connections 135, 160. This prevents sending repeated or cascaded acknowledgements for the same data transferred over the wide area network (WAN) thereby avoiding performance degradation.

In some embodiments, only delivery controllers 125, 170 associated with multipath connections are responsible for acknowledging the data received over the WAN and for retransmission of unacknowledged data. In this instance, VPN client 145 and server 155 are enabled to use transport protocol such as UDP, which delivers the data without sending acknowledgements; proxies 115 and 185 may likewise be enabled to prevent sending acknowledgements from the client 110 and the content server 195 over the WAN.

In some embodiments, proxy 115 terminates connections with the client 110, while proxy 185 terminates connections with the content server 195, thereby stopping corresponding acknowledgements and passing only the packet payloads. In another example, proxies 115 and 185 function as "snoop" proxies: instead of terminating connections with the client 110 and the content server 195, they block generated acknowledgements and create simulated acknowledgements close to the sender. For instance, proxy 115 would block all acknowledgements by the client 110 receiving data from the server 195, while proxy 185 would simulate acknowledgements for all data sent by the server 195. Likewise, proxy 185 could block acknowledgments by the content server 195 and proxy 115 could provide simulated acknowledgments to the client 110 for all data sent by the client 110.

In some embodiments, balance between active connections 135, 160 and reserve connections 140, 165 changes for different network environments. For instance, if packet losses remain random, previously reserved connections could become active to further decrease impact of each packet loss.

In some embodiments, all transport connections 135, 140, 160, 165 opened by the multipath manager 120, 180 become active when there is a need to transfer the data requested by the client, i.e. there are no reserve connections.

In some embodiments, a total number of active connections 135 opened by the near transport manager 120 increases with increase of the number of data files simultaneously downloaded to the client 110. This allows VPN users to get a better share of the available resources, compensating for the limitation of the single connection queue by increase of the average throughput.

In one implementation of the embodiment depicted in FIG. 1, a single transport connection 150 is opened between the VPN client 145 and the VPN server 155. In another implementation, multiple transport connections 150 carrying the multiplexed data of connections 135, 160 can be opened between the same VPN client 145 and VPN server 155. In some embodiments, the number of transport connections 150 carrying the multiplexed data is smaller than the number of connections 135, 160 opened by the multipath manager and multiplexed through connections between the VPN client 145 and the VPN server 155. For example, there may be a single connection 150.

In some embodiments, VPN client 145 opens multiple connections 150 to the same VPN server 155 when the client 110 requests concurrent download of multiple data streams, allowing the client 110 to utilize multiple connection queues on the intermediate router or a switch. For instance, if client opens eight simultaneous download streams, they could be split between 64 simultaneous transport connections 135, 160 opened by the near transport manager 120, and then multiplexed though eight transport connections 150 between the VPN client and the VPN server. In some embodiments, the same number of multipath connections 135, 160 created by the multipath manager 125 can be multiplexed through the different numbers of the transport connections 150 between the same VPN client 145 and the same VPN server 155.

In another example, VPN client 145 opens multiple connections to two or more different VPN servers 155, processing different client requests. For instance, client 110 can request to download a file stored on a first content server 195 in location A, through a first VPN server 155 near location A. The same client 110 can also request download of a file stored on a second content server 195 in a different location B, through a second VPN server 155 near location B. In this case, multipath manager 120 may generate a different set of multipath connections 135 for each VPN server 155, to be multiplexed through one or more connections 150 between the VPN client 145 and the corresponding VPN server 155.

Figure 2:
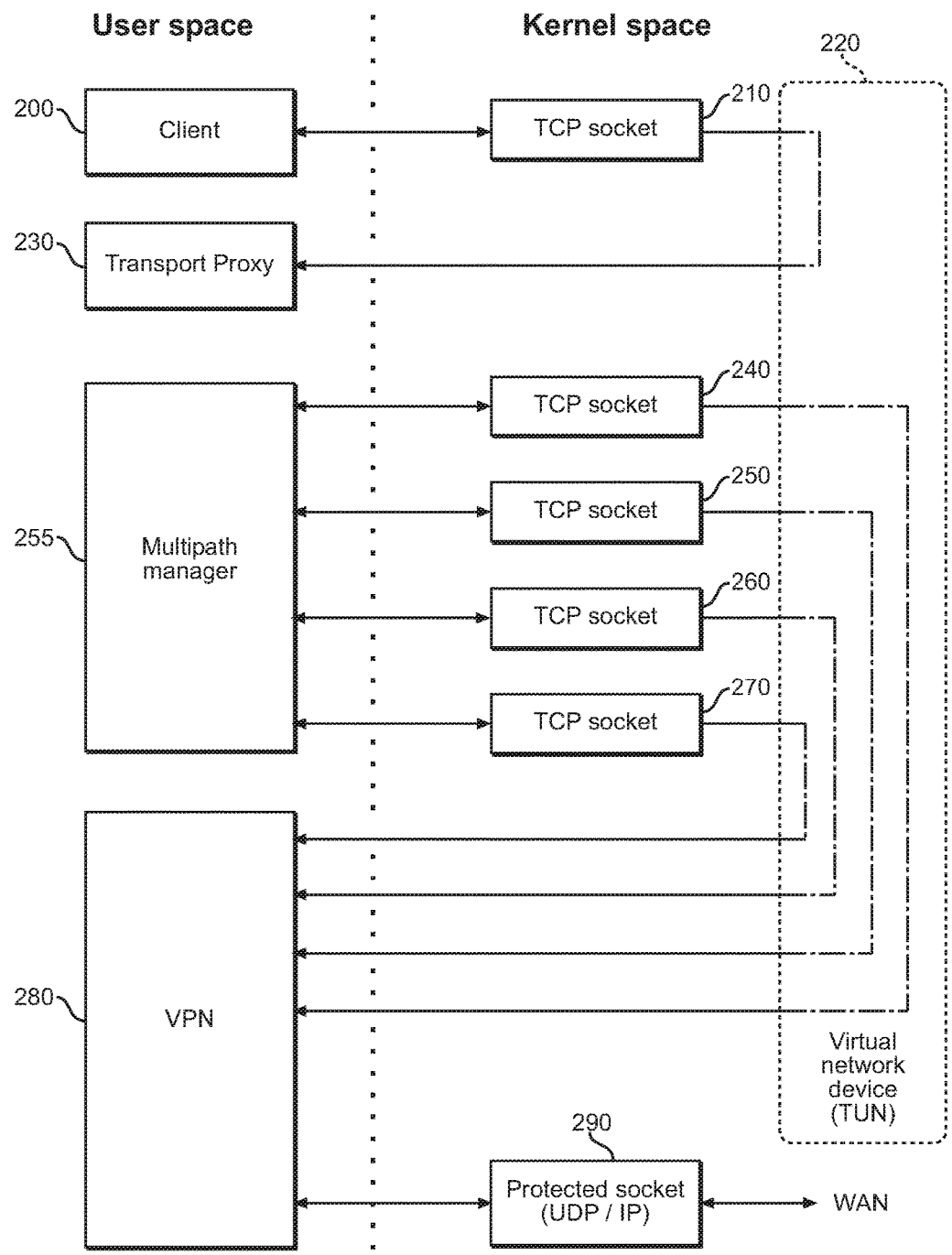
FIG. 2 is a diagram of a second environment used to implement a client side of the data transfer through multiple simultaneous transport connections multiplexed through the VPN in accordance with an embodiment of the present invention.

FIG. 2 is a diagram of a second environment used to implement a client side of the data transfer through multiple simultaneous transport connections, multiplexed through the VPN connection 150.

FIG. 2 depicts a client-side implementation where proxy 115, multipath manager 120, and VPN client 145 are all running on the same computing device, for instance a desktop computer or a mobile phone. In this implementation, a client application 200 (for instance, a web browser or a mobile application) executed in user space and opens a TCP socket 210 that sends the traffic to a Virtual network device 220. Virtual network device 220 comprises a TUN (network TUNnel) device operating in the kernel space of the operating system executing on the computing device Terms "kernel space" and "user space" may be understood to refer to the two types of virtual memory provided by the modern computer operating systems such as LINUX and WINDOWS. Primarily, separation between the kernel and user space serves to provide memory protection and hardware protection from malicious or errant software behavior. Kernel space is strictly reserved for running a privileged operating system kernel, kernel extensions, and most device diivers in contrast, user space refers to the memory area used to execute various programs and libraries interacting with the privileged operating system running in the kernel space: software that performs input/output, manipulates file system objects, application software, etc.

The virtual network device 220 shifts the traffic back to the user space. A transport proxy 230 intercepts the traffic from the TCP socket 210, terminates its connection, and sends the payload from the intercepted traffic to a multipath manager 255, also running in the user space. Multipath manager 255 distributes this payload over multiple transport connections opened through sockets 240, 250, 260, 270. Instead of sending the data from the multiple connections 240-270 over the wide area network (WAN), as in the known implementations of the multipath transport, in the illustrated embodiment, the TCP sockets 240-270 again send the data to the virtual network device 220, which shifts the traffic back into the user space. The packets from the multiple transport connections are intercepted in the user space by a VPN client 280. VPN client 280 opens a tunnel over a WAN to a VPN server using a transport protocol that doesn't send acknowledgements of received packets (for instance, UDP or IP). To establish the connection with the VPN server in bypass of the virtual network device 220, in the depicted implementation, the VPN client 280 uses a protected socket 290. In some embodiments, VPN client 280 may bind to a different network interface or use another means to make sure that its traffic isn't redirected to the user space but rather sent directly through the WAN.

Upon receiving the packets from the TCP sockets 240-270 associated with multiple transport connections created by the multipath manager 255, VPN client 280 encapsulates each packet, encrypting it as a payload and adding the headers for the transport protocol of the VPN tunnel (for instance, UDP/IP). As a result, packets from multiple TCP transport connections 240-270 are multiplexed over the one or more UDP connections before being sent through the WAN. Correspondingly, the packets received through the WAN are de-encapsulated (their UDP/IP wrappers are removed), and then sent to corresponding TCP sockets 240-270. TCP sockets 240-270 are then configured to transmit acknowledgments of the received data. The TCP sockets 240-270 are further configured to, when sending their own data, re-transmit any unacknowledged data. As a result of using multiple TCP sockets 240-270 in parallel to process a single client's request, any random packet drop over the WAN only decreases a single congestion window maintained by one TCP socket 240-270, while the other TCP sockets 240-270 continue to process data at the full speed.

In some embodiments, both transport proxy 230 and VPN client 280 listen to the packets from the virtual network device 220. Transport proxy 230 intercepts all packets sent from the virtual network device 220 except packets sent to a specific set of IP addresses and/or ports. The multipath manager 255 establishes multiple simultaneous transport connections 240-270 to the specific set of IPs and/or ports. The VPN client 280 intercepts only packets from the virtual network device 220 sent to the specific set of IPs and/or ports associated with the multiple simultaneous transport connections 240-270. As a result, transport proxy 230 intercepts and terminates all connections except ones establishes by the multipath manager 255 and the VPN client 280 encapsulates only packets sent through the connections 240-270 established by the multipath manager 255. In this implementation, multipath manager 255 and VPN client 280 are working independently and may not be programmed with information regarding one another: multipath manager 255 sends traffic through TCP connections 240-270 and VPN client 280 intercepts specific packets from the virtual network device 220.

In an alternative implementation, transport proxy 230 intercepts all packets from the virtual network device 220, but passes packets having specific IPs and/or ports used by the multipath transports 240-270 to the VPN client 280, instead of terminating their connections. In this case, VPN client 280 doesn't intercept the packets sent through the virtual network device 220, but receives them from the transport proxy 230. In this alternative implementation, demultiplexed packets, received over the WAN, may still be sent through the virtual network device 220 to the corresponding TCP sockets 240-270.

In another implementation, transport proxy 230 is replaced by the proxy 230, which is programmed to listen for the client traffic in user space on a specific port. For example, the client application 200 may be an Internet browser such as a Chrome browser developed by the Google Corporation, and its settings specify use of a local proxy 230 listening on a specific port. In this case, traffic between the client 200 and the proxy 230 is exchanged in the user space, without going through the kernel space and only connections created by the multipath manager 255 go through the kernel space and then get intercepted by the VPN client 280 in the manner described above.

The above-described implementations have a common feature of exchanging traffic through the multipath connections controlled by the TCP sockets 240-270 in the kernel space. This simplifies the implementation by reusing reliable delivery transport protocol supported by the operating system. In alternative implementations, TCP sockets 240-270 used by the multipath transports may be executed in the user space, reducing or eliminating the packet transfer between the kernel and the user space.

In some embodiments, similar implementations are used both on the client side and on the server side. In other embodiments, the server side may utilize a different implementation, for instance, by using a separate VPN appliance 155 that intercepts all packets sent from the multipath manager 180 over the local network.

Figure 3:
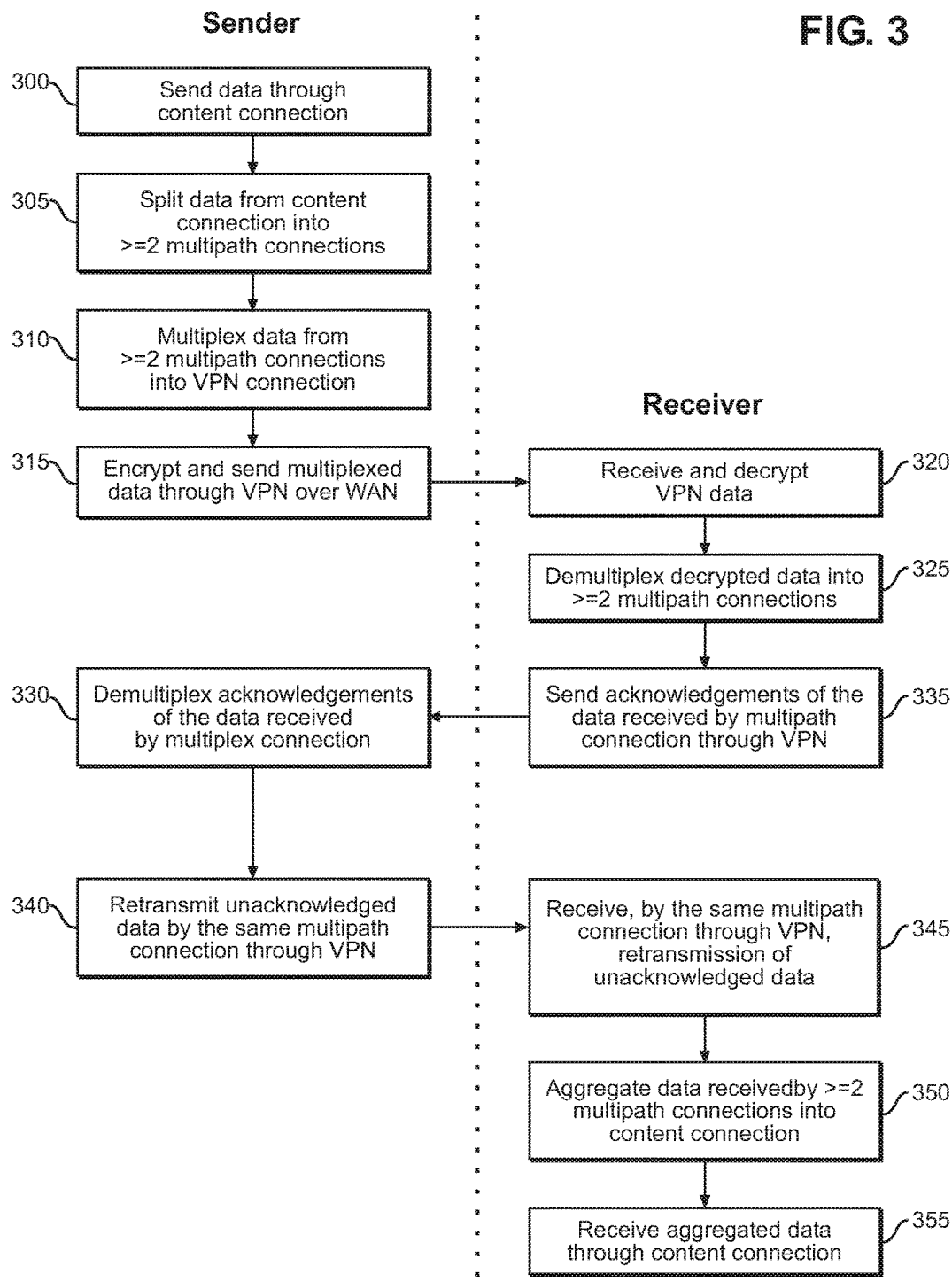
FIG. 3 is a process flow diagram of a method for implementing the data transfer through the multiple simultaneous transport connections multiplexed through the VPN in accordance with an embodiment of the present invention.

FIG. 3 is a process flow diagram of an embodiment of a method of the data transfer through multiple simultaneous transport connections, multiplexed through a smaller number of VPN tunnels, such as a single VPN tunnel. The method of FIG. 3 may be executed using any of the configurations of FIGS. 1 and 2 and the various embodiments discussed above.

In the illustrated embodiment, a sender (for instance a content server) sends 300 the data requested by the client ("receiver" in FIG. 3). These data, even if they comprise a content of a single file, are split 305 between two or more simultaneously open transport connections. Packets from these connections are multiplexed 310 into a single VPN connection, for instance by encrypting 315 the payload of each packet, encapsulating the encrypted payload inside a VPN packet of the VPN tunnel and then sending the VPN packet over the WAN.

The receiver extracts and decrypts 320 the payload, and then demultiplexes 325 the packets contained in the payload to their corresponding connections.

In the depicted implementation, the receiver sends 335 acknowledgements of the received data only after they are demultiplexed to the multipath transport connections. Each transport connection of these transport connections acknowledges only the data sent through the each transport connection. The VPN connection used to transmit multiplexed data doesn't acknowledge their arrival in the illustrated embodiment, relying on the multiple transport connections to provide reliable delivery.

The sender receives and demultiplexes 330 acknowledgements and then retransmits 340 unacknowledged data.

Again, each transport connection only retransmits the data not acknowledged after being sent inside that transport connection, without affecting others of the transport connections. In this way, random packet loss over the WAN may decrease the TCP congestion window for one transport connection, while other transport connections would maintain large congestion windows and operate at higher rate.

After the retransmitted data are received 345 by the corresponding multipath connections, these data are aggregated 350 with data from other multipath connections and the aggregated data is then received 355 into a content connection. The receiver side of the content connection doesn't have to acknowledge the received data: reliable delivery is managed through the multipath transport connections, improving the throughput in the presence of the random packet losses.

Figure 4:
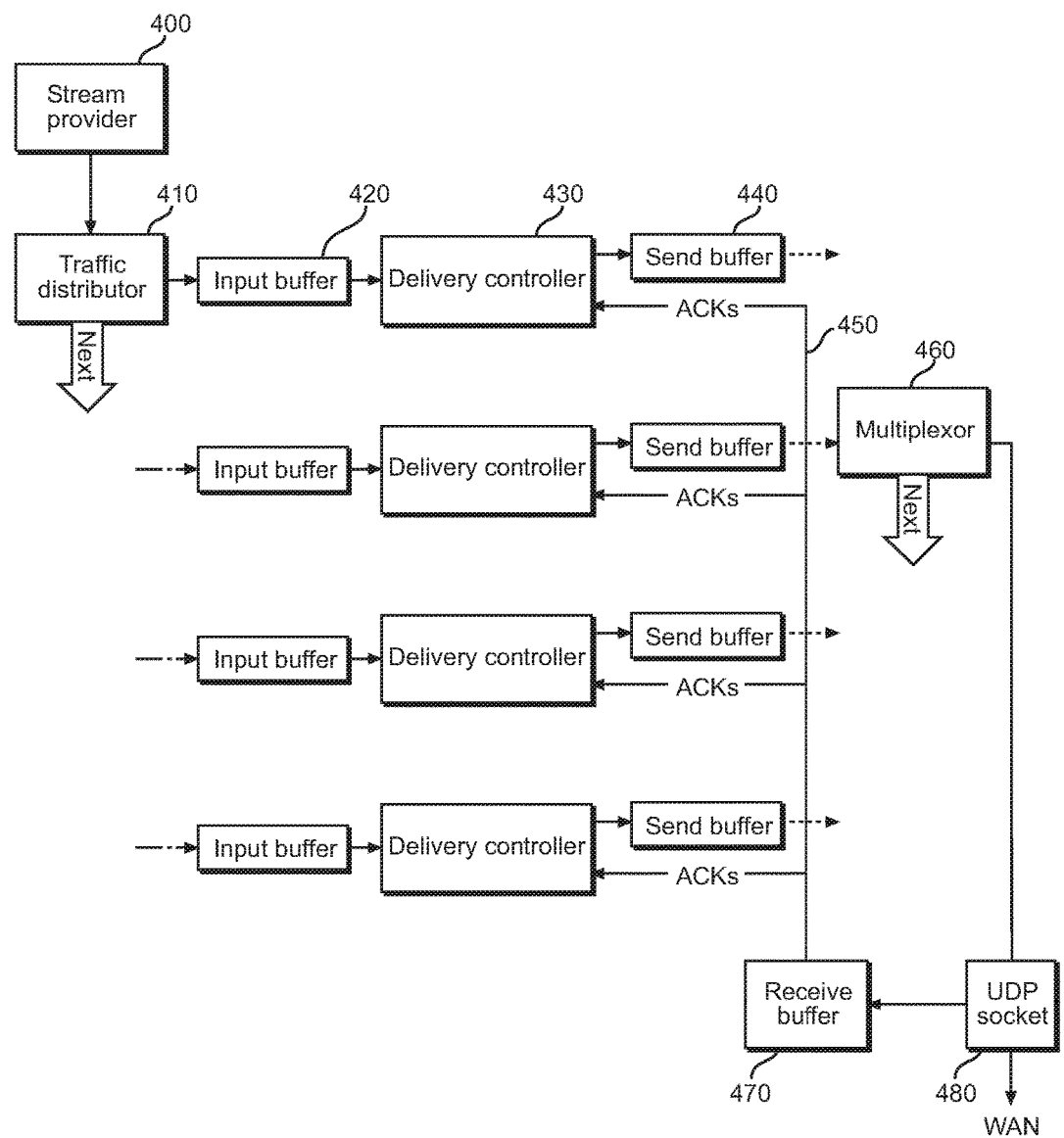
FIG. 4 is a diagram of a third environment used to implement client side of the data transfer through multiple simultaneous data flows multiplexed through a transport connection in accordance with an embodiment of the present invention.

FIG. 4 is a diagram of a third environment used to implement a client side of data transfer through multiple simultaneous data flows, multiplexed through a transport connection.

In this implementation, a provider 400 of the content data stream (for instance, a content server responding with the data requested by a client), sends the data to a traffic distributor 410, which splits the provided data and distributes portions of the provided data among multiple input buffers 420. In some embodiments, the traffic distributor 410 is implemented as a round-robin loader, rotating through available input buffers 420. In other instances, distributor 410 may distribute the traffic unevenly, based, for instance, on a velocity of data consumption from each input buffer 420, or the amount of the available space in each input buffer 420.

Each input buffer 420 feeds a delivery controller 430, which removes data from its corresponding input buffer 420 and sends the data to its sender buffer 440. The delivery controller 430 also receives acknowledgements of previously sent data and retransmits unacknowledged data. In some embodiments, the delivery controller 430 implements a congestion control algorithm at least partially similar to implementation used by the TCP protocol: only a limited amount of new data (lesser of the sizes of a congestion window and a flow control window) is allowed to be sent without receiving the confirmation of previously sent data. If previously sent data remains unacknowledged, it is retransmitted and the size of the congestion window is temporarily decreased to decrease the sending rate. In alternative implementations, delivery controllers 430 may support different reliable delivery algorithms, for instance by only retransmitting data marked as "important", such as I-frames of a compressed video stream.

In some embodiments, delivery controllers 430 work independently from each other. For example, in some embodiments, each delivery controller 430 only accepts acknowledgements of the data that it previously submitted to its corresponding send buffer 440 and can only adjust its own congestion window without changing congestion windows of the other delivery controllers 430. In another implementation, delivery controllers 430 may exchange at least some information. For instance, if synchronized losses are detected between multiple controllers 430, some controllers 430 may pause sending new data.

Data from the send buffers 440 is read by a multiplexor 460. In the described implementation, this multiplexor 460 reads data from each send buffer 440 in turn. In another implementation, the multiplexor 460 can change the sequence of accessing the send buffers 440 (for instance, based on an amount of stored data or available space in each send buffer 440), or access multiple send buffers 440 in parallel.

In some embodiments, each delivery controller 430 adds a header to the payload data, before forwarding the payload data and header to its corresponding send buffer 440. In some embodiments, the added header contains one or more fields from the group of identifier, source port, acknowledgment number, set of flags and window size. If a source port is present in the header, it may be used as an identifier of the corresponding delivery controller 430. The format of this header could be, for instance, at least partially the same as the format of a TCP header. In some embodiments, this header doesn't contain a valid checksum inasmuch as integrity of the received data is verified by using a checksum of the transport protocol used to exchange multiplexed data, such as UDP protocol. In such embodiments, validation of a received data unit is performed only once, saving computing resources. In another implementation, at least part of the header is added by the multiplexor 460, after it reads the data from each send buffer 440.

The multiplexor 460 sends each data unit containing the payload and the header to a socket 480, which is responsible for maintaining a transport connection with another computer over the WAN. In this implementation, the socket 480 is a UDP socket, which can deliver the data without receiving acknowledgements of previous deliveries.

In some embodiments, data emitted by the delivery controllers 430 is encrypted after being multiplexed by the multiplexor 460 into a smaller number of data flows. In some embodiments, multiplexor 460 performs data encryption before sending the data to the UDP socket 480.

In another implementation, data can be encrypted by each delivery controller 430, before being sent to the multiplexor 460. In yet another implementation, only data streams not encrypted by the sender (for instance, ones using HTTP protocol) are encrypted by either multiplexor 460 or delivery controllers 430. In such embodiments, data streams already encrypted by the sender (for instance, ones using HTTPS protocol) are not additionally encrypted.

In yet another implementation, the multiplexor 460 encrypts at least a portion of the packets containing the data streams encrypted by the sender. For instance, to hide specific headers associating different packets with different delivery controllers 430.

FIG. 4 depicts a sender-side implementation. In some embodiments, a receiver computer contains the same number of delivery controllers 430 as the sender computer. Each controller 430 from one computer is coupled with a controller on another computer, maintaining a single data stream. In this implementation, the sender computer's socket 480 receives acknowledgements generated by the coupled delivery controllers 430 of the receiver computer. These acknowledgements are temporarily stored in a receive buffer 470, and then passed to corresponding delivery controllers 430 (each acknowledgement contains identifier of the corresponding data stream associated with the coupled delivery controllers and is therefore delivered to the delivery controller 430 referenced by the each acknowledgment).

Figure 5:
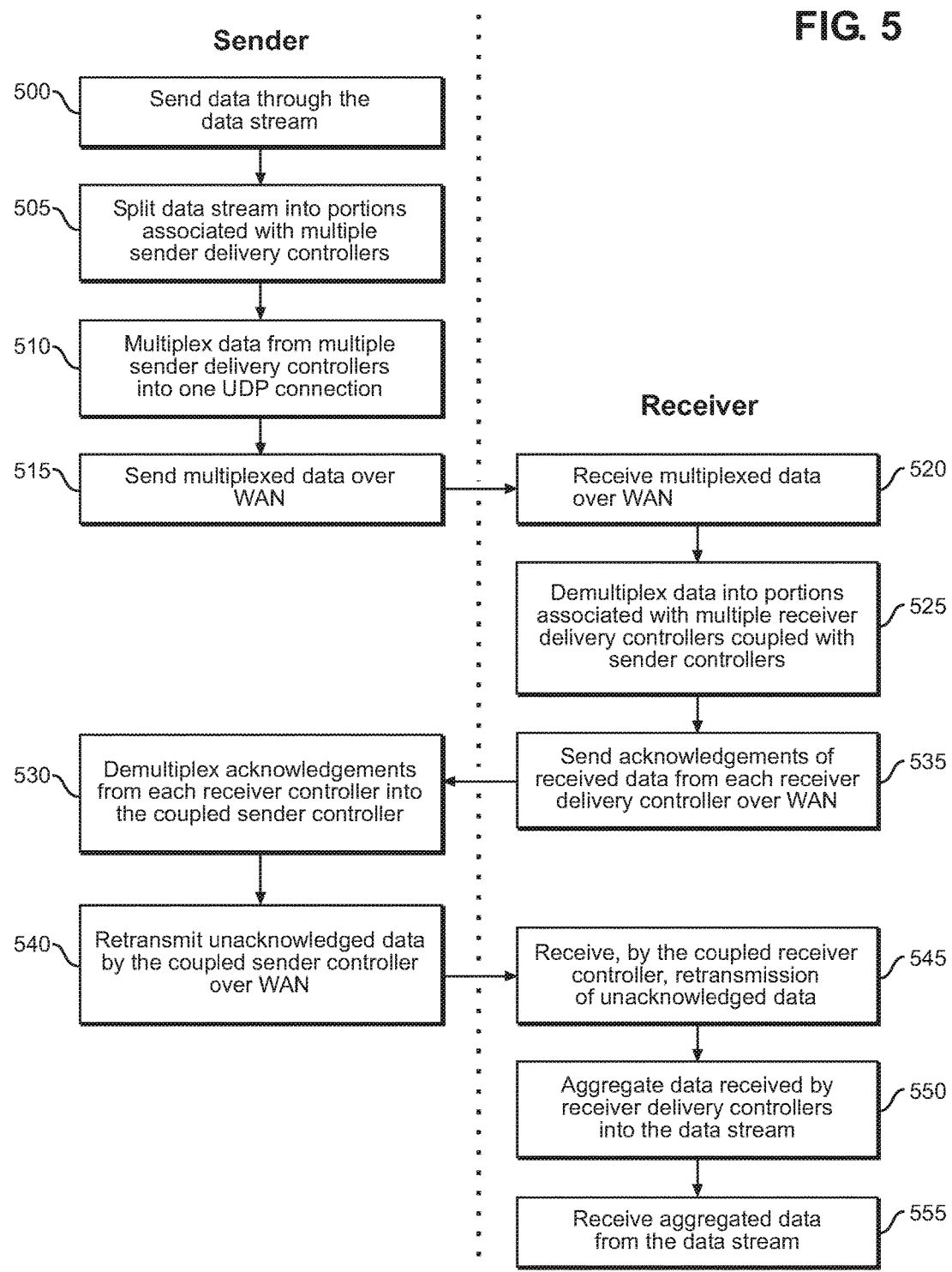
FIG. 5 is a process flow diagram of a method of the data transfer through multiple simultaneous data flows multiplexed through one or more transport connections in accordance with an embodiment of the present invention.

FIG. 5 depicts a process flow diagram of a method for the data transfer through multiple simultaneous data flows multiplexed through one or more transport connections. The method of FIG. 5 may be implemented using the environment of FIG. 4 and any of the various implementations described above.

The method of FIG. 5 describes both sender-side and receiver-side implementations. A sender sends 500 data through a data stream, which data stream is then split 505 between multiple data flows associated with separate delivery controllers. Data from sender's controllers are multiplexed 510 over one or more transport connections and sent 515 over the WAN.

The receiver receives 520 the sent data and demultiplexes 525 them into data flows passed to corresponding delivery controllers 530, i.e. each unit of data, e.g. packet, received at step 520 is passed to a delivery controller referenced by the each unit of data.

In some embodiments, the sender encrypts the data after multiplexing 510 them into the UDP connection. Accordingly, in such embodiments, the receiver decrypts the data before demultiplexing 525 them into the corresponding delivery controllers 430.

In some embodiments, the sender, after multiplexing 510 the data from multiple delivery controllers 430, inserts additional data used for error correction, and then sends this additional data over the WAN together with the multiplexed data. In some embodiments, the receiver performs error correction on the received data before demultiplexing 525 that data to the corresponding delivery controllers using this additional data. In some embodiments, the receiver maintains a queue used for the error correction (for instance, if sender inserts additional packet equal to the XOR of the previous 8 packets, receiver keeps the error correction packet until at least 7 of its original packets are received, or until a pre-defined time interval has expired).

After receiving demultiplexed data, each receiver's controller 430 sends 535 acknowledgements of the received data, each controller's acknowledgments referencing the corresponding controller of the sender. The sender demultiplexes received acknowledgements and passes 530 them to the corresponding delivery controllers referenced by the acknowledgments. Any delivery controller that determines that an acknowledgment has not been received for data will then retransmit 540 unacknowledged data. The receiver receives and acknowledges 545 retransmitted data. The receiver then aggregates 550 the data received through multiple delivery controllers into the data stream, before passing 555 the data stream to the recipient.

In some embodiments, each of the first and the second computers exchanging the data over the WAN implement both sender and receiver components. In particular, the sender side splits uploads between multiple data flows maintained by the delivery controllers and multiplexes these flows over one or more transport connections. The receiver side demultiplexes the received data and aggregates them into the single stream. Multiple data streams can be processed at the same time, each stream being split, multiplexed and aggregated after being transferred over the WAN.

The embodiments described above with respect to FIGS. 4 and 5 increase the throughput in the presence of random packet losses over the WAN by splitting the original data streams into multiple asynchronous data flows, each data flow maintaining completely or at least partially independent control over its delivery rate. In comparison with embodiments depicted by FIGS. 1 and 2, the embodiment depicted by FIG. 4 doesn't include establishing multiple simultaneous transport connection that are subsequently multiplexed through a smaller number of transport connections such as a single VPN tunnel. The embodiment of FIG. 4 can be completely implemented in the user space, relying on coupled delivery controllers 430 to maintain independent data flows while improving the fairness in comparison with using separate multipath transports.

The embodiment of FIGS. 4 and 5 also provides significant advantage over the protocols that use a single data flow with throughput exceeding a regular TCP transport protocol (for instance, QUIC protocol, developed by Google Corporation, uses single data flow controlled by the MulTCP algorithm). Packet loss in the single data flow may result in a retransmission time out (RTO), decreasing throughput of the whole data stream. Such RTO may occur, for instance, if packet is lost at the tail of the delivery and tail loss probe did not succeed. In comparison, RTO in one of the data flows implemented according to the embodiments of FIGS. 4 and 5 affects only that data flow: all other data flows may continue data exchange at the full speed. Also, delivery controllers 430 for each of the multiple data flows may implement standard congestion and flow control algorithms, such as ones used by the TCP protocol. This is better than relying on custom modifications of congestion control for a single flow, such as MulTCP, which has not been widely tested over the real networks.

In another aspect of the present invention, one or more of the plurality of multipath connections are not multiplexed over one or more common transport connections. Instead, these multipath connections are established directly between the computers exchanging the data over the WAN, in parallel with the connections used to multiplex multipath connections.

Figure 6:
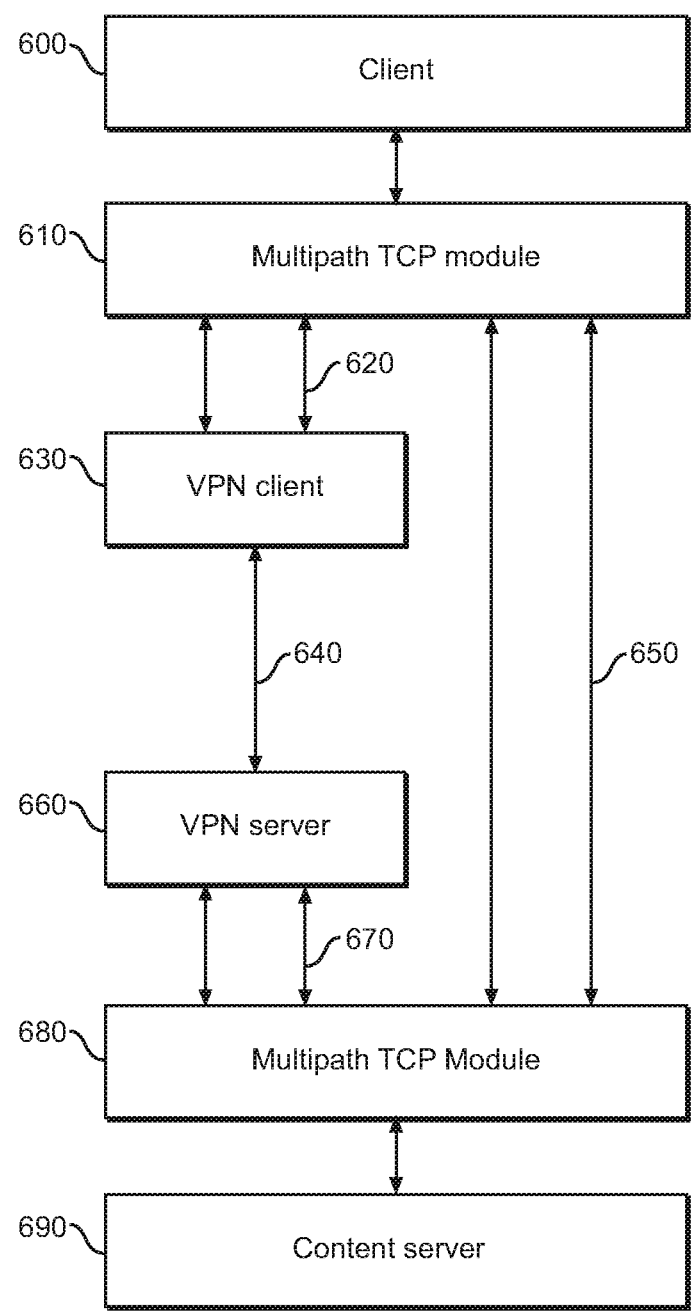
FIG. 6 is a diagram of a fourth network environment used to implement data transfer through multiple simultaneous transport connections, where only a portion of the simultaneous connections are multiplexed in accordance with an embodiment of the present invention.

FIG. 6 is a diagram of the fourth network environment used to implement data transfer through multiple simultaneous transport connections, where only portion of the simultaneous connections are multiplexed.

In the depicted implementation, client 600 requests download of a single file from the content server 690. Multipath data managers include multipath TCP modules 610 and 680 that split the uploads over multiple TCP connections 620, 650, 670 and aggregate the downloads from the multiple TCP connections 620, 650, 670 into a single data stream. The manner in which the multipath TCP modules 610, split data among multiple TCP connections and then aggregate the data at the receiver may be performed according to any of the embodiments described above.

In the embodiment of FIG. 6, only some of these TCP connections (620, 670) are multiplexed over a tunnel connection 640 between a VPN client 630 and a VPN server 660. One or more of the remaining TCP connections 650 are established directly between the multipath TCP modules 610 and 680, instead of being multiplexed.

In some embodiments, multipath connections 670 (ones multiplexed through the VPN tunnel 640) carry payload data, such as a content of requested file whereas at least some of the non-multiplexed connections 650 carry control signals, such as acknowledgements of received data, congestion indications or instructions to adjust delivery parameters. This implementation decreases the latency of receiving the acknowledgements (they don't have to be multiplexed through the VPN tunnel 640 and may be sent without encryption without compromising payload security). At the same time, the amount of bandwidth used by the control signals such as acknowledgements is much lower than the amount of bandwidth used by the payload data, improving fairness in comparison with the case where all multipath transports are established without multiplexing them over a smaller number of VPN or proxy connections.

In another embodiment, VPN tunnel 640 is established over a different data link than one or more of direct multipath connections 650. For instance, download of the single file is split between multiple TCP connections multiplexed inside a single VPN tunnel 640 established over a Wi-Fi interface and an additional TCP connection is established over a mobile network interface. In some embodiments, data through the mobile interface only includes the acknowledgements of the data received over the Wi-Fi interface and demultiplexed from the VPN connection 640. In other embodiments, data through the mobile interface may carry at least some of the packets that don't require additional encryption, for instance when the client 600 and the server 690 exchange the data using the HTTPS protocol.

Figure 7:
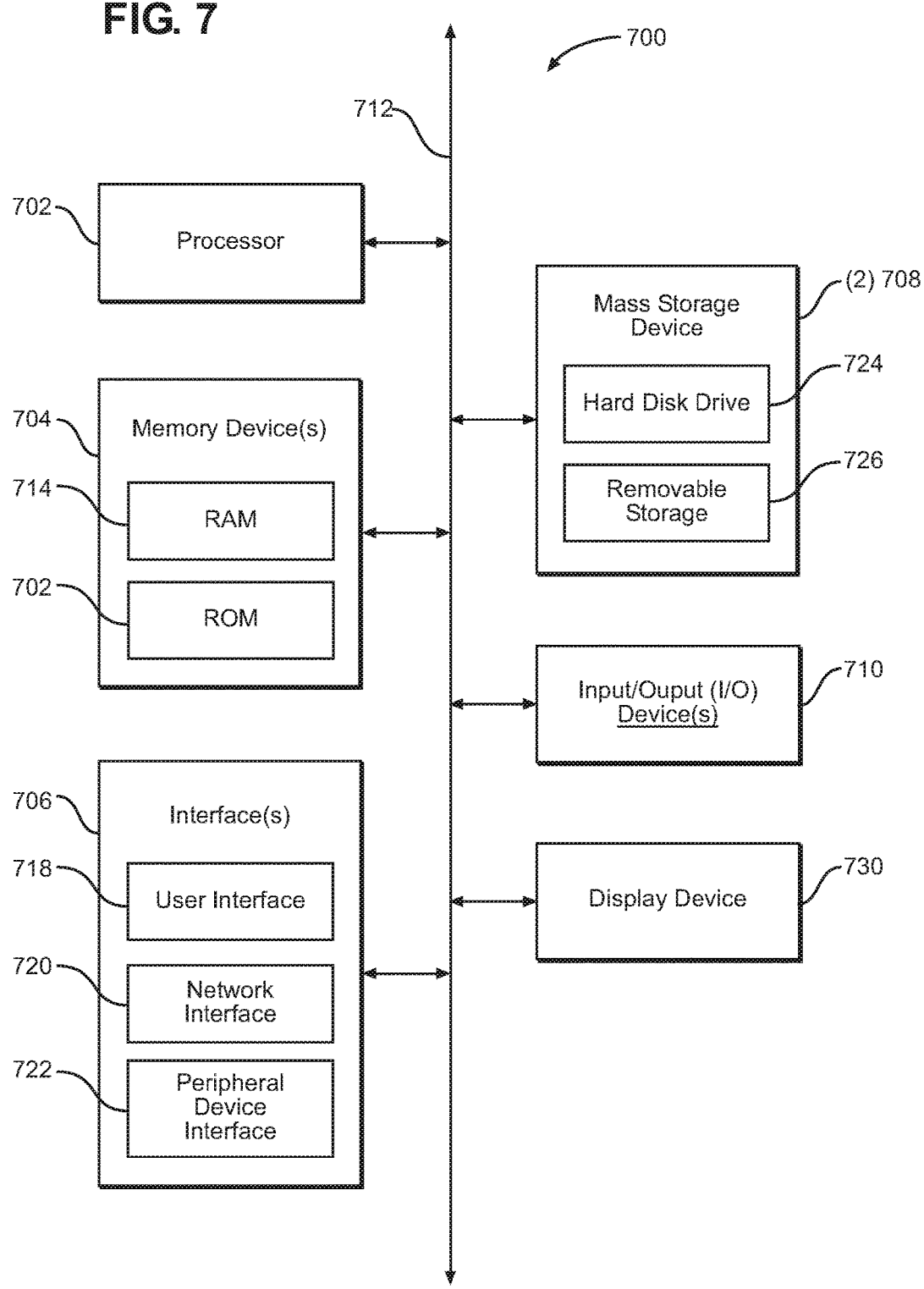
FIG. 7 is a diagram of a computing device suitable for implementing components and methods described herein.

Computing devices (client, content server, etc.), networking components, and modules described herein may have some or all of the attributes of the computing device 700 of FIG. 7. In particular, components described above as being a computer or a computing device may have some or all of the attributes of the computing device 700 of FIG. 7. FIG. 7 is a block diagram illustrating an example computing device 700 which can be used to implement the systems and methods disclosed herein Computing device 700 includes one or more processor(s) 702, one or more memory device(s) 704, one or more interface(s) 706, one or more mass storage device(s) 708, one or more Input/Output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, etc.), keyboards, and the like.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system comprising one or more processing devices and one or more memory devices operably coupled to the one or more memory devices, the one or more memory devices storing executable code effective to cause the one or more processing devices to:

execute a distributor, programmed to:
receive a stream of data including a response to a request for data;
divide the stream into a plurality of data portions;
distribute at least part of the plurality of data portions to a plurality of local delivery controllers executing on the system;
process, by each local delivery controller of the plurality of local delivery controllers connected to a corresponding remote delivery controller on a remote computer system, the data portions distributed to the each local delivery controller by:
encapsulating the data portions distributed to the each local delivery controller within outbound packets, the outbound packets including a header including a controller identifier of the each local delivery controller; and
writing the outbound packets in a buffer of the each local delivery controller;
process, by a local multiplexor executing on the system, the outbound packets of the plurality of local delivery controllers by:
reading the outbound packets from the buffers of the plurality of local delivery controllers and multiplexing the outbound packets onto a transport connection to the remote computer system such that the outbound packets from the buffers of the plurality of local delivery controllers are transmitted on the transport connection according to a transport protocol that does not acknowledge receipt of at least some packets; and
receiving, by the local multiplexor over the transport connection, acknowledgments each corresponding to at least one of the outbound packets of the plurality of local delivery controllers;

process, by the local multiplexor, the acknowledgments by, for each acknowledgement of at least some of the acknowledgments:
retrieving an included identifier in the each acknowledgment;
identifying a matching delivery controller of the plurality of local delivery controllers having the controller identifier thereof matching the included identifier; and
providing the each acknowledgment to the matching delivery controller;
evaluate whether (a) no acknowledgment was provided by the multiplexor for at least one outbound packet written to the buffer of the at least one local delivery controller; and
in response to (a), place the at least one unacknowledged outbound packet in the buffer of the at least one local delivery controller of the plurality of local delivery controllers.

2. The system of claim 1, wherein the each local delivery controller of the plurality of local delivery controllers is further programmed to, independently from the other local delivery controllers of the plurality of local delivery controllers and without exchanging information with the other local delivery controllers, change an amount of sent data that the each delivery controller permits to be sent before receiving an acknowledgement of at least some of the sent data from the corresponding remote delivery controller.

3. The system of claim 1, wherein the plurality of local delivery controllers implement one or more first transport protocols include one or more congestion control algorithms of the Transport Control Protocol (TCP).

4. The system of claim 1, wherein the transport protocol that does not acknowledge data receipt includes Universal Datagram Protocol (UDP).

5. The system of claim 1, wherein the executable code is further effective to cause the one or more processing devices to send the data portions provided to the each local delivery controller to the corresponding remote delivery controller using a secure communication protocol selected from the group including Secure Sockets Layer (SSL) protocol and Transport Layer Security (TLS) protocol.

6. The system of claim 1, wherein the distributor further comprises a proxy programmed to:
terminate the stream of data;
extract payload data from the stream of data; and
allocate the payload data among the plurality of local delivery controllers in the data plurality of data portions.

7. The system of claim 1, wherein the local multiplexor is programmed to multiplex onto the transport connection the flows of data of outbound packets of the plurality of local delivery controllers by (a) encrypting the outbound packets after the outbound packets are multiplexed with one another to obtain an encrypted data flow and (b) transmit the encrypted data flow to the remote multiplexor over the transport connection.

8. A method comprising:
receiving, on a computer system including at least one memory device and at least one processing device, a stream of data including a response to a request for data;
dividing, by the computer system, the stream into a plurality of data portions;
distributing, by the computer system, the plurality of data portions to a plurality of local delivery controllers executing on the computer system;
processing, by each local delivery controller of the plurality of local delivery controllers connected to a corresponding remote delivery controller on a remote computer system, the plurality of data portions distributed to the each local delivery controller by:
encapsulating the data portions distributed to the each local delivery controller within outbound packets, the outbound packets including a header including a controller identifier of the each local delivery controller; and
writing the outbound packets in a buffer of the each local delivery controller;
processing, by a multiplexor executing on the computer system, the outbound packets of the plurality of local delivery controllers by:
sequentially reading the outbound packets from the buffers of the plurality of local delivery controllers and multiplexing the outbound packets onto a transport connection to the remote computer system such that the outbound packets from the buffers of the plurality of local delivery controllers are transmitted on the transport connection according to a transport protocol that does not acknowledge receipt of packets; and
receiving, by the multiplexor over the transport connection, acknowledgments each corresponding to one of the outbound packets of the plurality of local delivery controllers;
processing, by the multiplexor, the acknowledgments, by, for each acknowledgement of the acknowledgments:
retrieving an included identifier in the each acknowledgment;
identifying a matching delivery controller of the plurality of local delivery controllers having the controller identifier thereof matching the included identifier; and
providing the each acknowledgment to the matching delivery controller;
performing, by at least one local delivery controller of the plurality of local delivery controllers:
(a) determining that no acknowledgment was provided by the multiplexor to the at least one local delivery controller for at least one outbound packet written to the buffer of the at least one local delivery controller; and
in response to (a), again placing the at least one outbound packet in the buffer of the at least one local delivery controller.

9. The method of claim 8, wherein each local delivery controller has a connection to the corresponding remote delivery controller according to one of Transport Control Protocol (TCP), Multipath Transport Control Protocol (Multipath TCP), and Stream Control Transmission Protocol (SCTP).

10. The method of claim 8, wherein each local delivery controller has a connection to the corresponding remote delivery controller according to one of Secure Sockets Layer (SSL) protocol and Transport Layer Security (TLS) protocol.

11. The method of claim 8, wherein the transport protocol that does not acknowledge receipt of packets is Universal Datagram Protocol (UDP).

12. The method of claim 8, wherein the transport protocol that does not acknowledge receipt of packets is one of Internet Protocol (IP) Encapsulating Security Payload (ESP) protocol, Software IP Encryption protocol (swiPe), Secure Sockets Layer (SSL) protocol and Transport Layer Security (TLS) protocol.

13. The method of claim 8, further comprising:
terminating a local connection over which the stream of data is received;
extracting payload data from the stream of data; and
dividing the payload data into the plurality of data portions.

14. The method of claim 8, wherein the multiplexor is a Virtual Private Network (VPN) client coupled to a remote multiplexor on the remote computer system, the remote multiplexor being a VPN server and the transport connection being a VPN tunnel.

15. The method of claim 14, wherein the VPN tunnel is implemented according to one of Point-to-Point Tunneling Protocol (PPTP), Layer 2 Tunneling Protocol (L2TP), Internet Protocol Security (IPSec), Secure Socket Layer (SSL) protocol, and OpenVPN protocol.

* * * * *